United States Patent
Kim et al.

(10) Patent No.: US 11,880,773 B2
(45) Date of Patent: Jan. 23, 2024

(54) METHOD AND APPARATUS FOR PERFORMING MACHINE LEARNING BASED ON CORRELATION BETWEEN VARIABLES

(71) Applicant: ELECTRONICS AND TELECOMMUNICATIONS RESEARCH INSTITUTE, Daejeon (KR)

(72) Inventors: Chulho Kim, Sejong (KR); Ock Kee Baek, Daejeon (KR); Inmoon Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 845 days.

(21) Appl. No.: 16/926,064

(22) Filed: Jul. 10, 2020

(65) Prior Publication Data

US 2021/0012213 A1 Jan. 14, 2021

(30) Foreign Application Priority Data

Jul. 12, 2019 (KR) ........................ 10-2019-0084678

(51) Int. Cl.
*G06N 5/01* (2023.01)
*G06F 16/901* (2019.01)
*G06F 17/15* (2006.01)
*G06N 20/00* (2019.01)

(52) U.S. Cl.
CPC .......... *G06N 5/01* (2023.01); *G06F 16/9027* (2019.01); *G06F 17/15* (2013.01); *G06N 20/00* (2019.01)

(58) Field of Classification Search
CPC .. G06F 16/322; G06F 16/2246; G06F 7/5443; G06F 18/00; H03H 17/00; G06N 3/02; G06N 5/00; G06N 7/02; H04B 1/707; G05B 13/00; G06T 1/20; G06V 30/194; G10L 15/16
See application file for complete search history.

(56) References Cited

U.S. PATENT DOCUMENTS 7,971,190 B2   6/2011   Davies et al.
2009/0210745 A1   8/2009   Becker et al.
(Continued)

FOREIGN PATENT DOCUMENTS

CN   108009914 A   *   5/2018   ............. G06Q 40/03
KR   10-2018-0120061 A       11/2018
WO   WO-2019088972 A1   *   5/2019   ............. G06N 20/20

OTHER PUBLICATIONS

Liu, "Credit Risk Assessment Method, System And Device, And Computer Storage Medium", English Machine Translation of Liu (CN-108009914-A), Clarivate Analytics, pp. 1-13 (Year: 2018).*
(Continued)

*Primary Examiner* — Alan Chen

(57) ABSTRACT

An apparatus and a method for performing machine learning by executing steps of: generating a decision tree-based machine learning model based on training data; selecting two variables from a decision tree of the machine learning model and determining a correlation between two selected variables; and performing the machine learning based on determined correlation are provided.

10 Claims, 4 Drawing Sheets

(56) References Cited

U.S. PATENT DOCUMENTS

| | | | |
|---|---|---|---|
| 2009/0248668 A1* | 10/2009 | Zheng | G06F 16/334 707/999.005 |
| 2015/0296152 A1* | 10/2015 | Fanello | G06F 18/241 348/241 |
| 2018/0189679 A1 | 7/2018 | Kang et al. | |
| 2018/0349313 A1 | 12/2018 | Ahn et al. | |

OTHER PUBLICATIONS

Ratsgo's blog, "Decision Tree", https://ratsgo.github.io/machine%20learning/2017/03/26/tree/, Mar. 26, 2017.
Office Action for related Korean application No. 10-2019-0084678, dated Mar. 28, 2022.
Kazemitabar et al., "Variable Importance using Decision Trees," Neural Information Processing Systems, 2017, pp. 1-10.

* cited by examiner

METHOD AND APPARATUS FOR PERFORMING MACHINE LEARNING BASED ON CORRELATION BETWEEN VARIABLES

CROSS-REFERENCE TO RELATED APPLICATION

This application claims priority to and the benefit of Korean Patent Application No. 10-2019-0084678 filed in the Korean Intellectual Property Office on Jul. 12, 2019, the entire contents of which are incorporated herein by reference.

BACKGROUND OF THE INVENTION

(a) Field of the Invention

This description relates to an apparatus and method for performing machine learning based on correlation between variables.

(b) Description of the Related Art

Correlation Analysis, used in probability theory and statistics, is a method for analyzing a linear relationship between two variables. Here, the strength of the relationship between the two variables is referred to as a correlation relationship (Correlation or Correlation Coefficient). There are various techniques for statistical correlation analysis, such as Pearson Correlation Coefficient analysis and Spearman Correlation Coefficient analysis, and so on. The conventionally known statistical correlation analysis method considers two variables (or multiple variables) that are related, but may exclude other variables related to the considered variables.

In the field of machine learning, a decision tree-based machine learning model such as a decision-tree model, a random forest, and a gradient boosting is widely used. The decision tree-based machine learning model can show a feature importance of variables (or features). However, the decision tree-based machine learning model does not show the correlation between each variable.

The above information disclosed in this Background section is only for enhancement of understanding of the background of the invention, and therefore it may contain information that does not form the prior art that is already known in this country to a person of ordinary skill in the art.

SUMMARY OF THE INVENTION

An exemplary embodiment provides an apparatus and a method for performing machine learning based on correlation between variables.

An apparatus for performing machine learning by determining a correlation between variables is provided according to an exemplary embodiment. The apparatus includes: a processor and a memory, wherein the processor executes a program stored in the memory to perform: generating a decision tree-based machine learning model based on training data; selecting two variables from a decision tree of the machine learning model and determining a correlation between two selected variables; and performing the machine learning based on determined correlation.

When the processor performs the determining of the correlation between two selected variables, the processor may perform: measuring a difference between results of an objective function to which the two variables are inputs; and determining that the correlation between the two variables is a positive correlation when the difference between the results is smaller than a predetermined first threshold.

When the processor performs the measuring of the difference between results of the objective function, the processor may perform measuring a difference between a first result value output from the objective function to which a pair consisting of the two variables is input and a second result value output from the objective function to which a converted pair for the pair is input, wherein an order of the two variables in the pair is converted within the converted pair.

When the processor performs the determining of the correlation between two selected variables, the processor may further perform: changing values of a first variable of the two variables when the difference is greater than the predetermined first threshold; generating a second machine learning model based on training data in which the values of the first variable are changed, and measuring a difference between results of the objective function based on the second machine learning model; and determining that the correlation between the two variables is a negative correlation when the difference between the results of the objective function determined based on the second machine learning model is smaller than a predetermined second threshold.

When the processor performs the determining of the correlation between two selected variables, the processor may further perform determining that the correlation between the two variables is a mutually independent correlation when the difference between the results of the objective function based on the second machine learning model is greater than the predetermined second threshold.

When the processor performs the selecting two variables from a decision tree of the machine learning model and determining a correlation between two selected variables, the processor may perform: determining the correlation for all pairs of variables included in the decision tree.

A method for performing machine learning by determining a correlation between variables is provided according to another exemplary embodiment. The method includes: generating a decision tree-based machine learning model based on training data; selecting two variables from a decision tree of the machine learning model and determining a correlation between two selected variables; and performing the machine learning based on determined correlation.

The determining a correlation between two selected variables may include: measuring a difference between results of an objective function to which the two variables are input; and determining that the correlation between the two variables is a positive correlation when the difference between the results is smaller than a predetermined first threshold.

The measuring a difference between results of an objective function to which the two variables are input may include measuring a difference between a first result value output from the objective function to which a pair consisting of the two variables is input and a second result value output from the objective function to which a converted pair for the pair is input, wherein an order of the two variables in the pair and the converted pair is opposite to each other.

The determining a correlation between two selected variables may include: changing values of a first variable of the two variables when the difference is greater than the predetermined first threshold; generating a second machine learning model based on training data in which the values of the first variable are changed, and measuring a difference between results of the objective function based on the second machine learning model; and determining that the correlation between the two variables is a negative correlation when the difference between the results of the objective function based on the second machine learning model is smaller than a predetermined second threshold.

The determining a correlation between two selected variables may further include determining that the correlation between the two variables is a mutually independent correlation when the difference between the results of the objective function based on the second machine learning model is greater than the predetermined second threshold.

The selecting two variables from a decision tree of the machine learning model and the determining a correlation between two selected variables may include determining the correlation for all pairs of variables included in the decision tree.

DETAILED DESCRIPTION OF THE EMBODIMENTS

Figure 1:
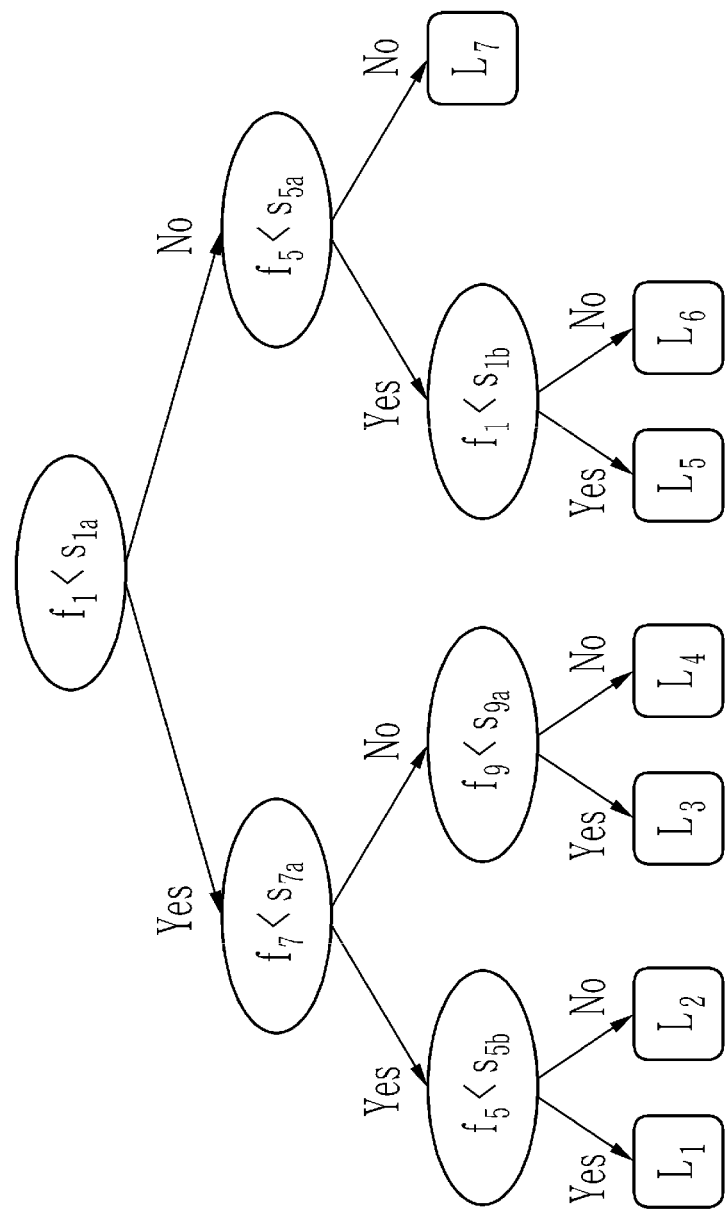
FIG. 1 is a diagram illustrating a decision tree generated from training data according to an exemplary embodiment.

In the following detailed description, only certain exemplary embodiments have been shown and described, simply by way of illustration. As those skilled in the art would realize, the described embodiments may be modified in various different ways, all without departing from the spirit or scope of the embodiment. Accordingly, the drawings and description are to be regarded as illustrative in nature and not restrictive, and like reference numerals designate like elements throughout the specification.

In this specification, redundant description of the same constituent elements is omitted. Also, in this specification, it is to be understood that when one component is referred to as being "connected" or "coupled" to another component, it may be connected or coupled directly to the other component or may be connected or coupled to the other component with another component intervening therebetween.

On the other hand, in this specification, it is to be understood that when one component is referred to as being "connected or coupled directly" to another component, it may be connected or coupled to the other component without another component intervening therebetween.

It is also to be understood that the terminology used herein is only used for the purpose of describing particular embodiments, and is not intended to limit the embodiment. Singular forms are to include plural forms unless the context clearly indicates otherwise.

It will be further understood that terms "comprises" and "have" used in the present specification specify the presence of stated features, numerals, steps, operations, components, parts, or a combination thereof, but do not preclude the presence or addition of one or more other features, numerals, steps, operations, components, parts, or a combination thereof.

Also, as used herein, the term "and/or" includes any plurality of combinations of items or any of a plurality of listed items. In the present specification, "A or B" may include "A", "B", or "A and B".

FIG. 1 is a diagram illustrating a decision tree generated from training data according to an exemplary embodiment.

Referring to FIG. 1, an example of a decision tree generated by a decision tree-based machine learning model based on training data is illustrated. In nodes represented by an ellipse in FIG. 1, $f_1$, $f_5$, $f_7$, and $f_9$ represent variables (or features or attributes), and $s_{1a}$, $s_{1b}$, $s_{5a}$, $s_{5b}$, $s_{7a}$, and $s_{9a}$, represent splitting points for variables displayed on the same node. In FIG. 1, each of the nodes (rounded squares) located at each end of the tree is Leaf, indicated by $L_1$ to $L_7$. An output value for the target variable is assigned to the Leaf. When the decision tree-based machine learning model performs a classification operation, the type and ratio of the classification value (Class) may be assigned to the Leaf. When the decision tree-based machine learning model performs a regression operation, an average value of data reaching the Leaf may be assigned to the Leaf.

A single decision tree-based machine learning model is established based on one single decision tree such as FIG. 1. The decision tree-based random forest or gradient boosting model may be established as an ensemble model based on a plurality of different decision trees. A method for determining correlation between variables according to an exemplary embodiment may be applied to various applications for generating a machine learning model based on the decision tree. For example, according to the exemplary embodiment, based on the correlation between the variables included in the decision tree, the machine learning may be effectively performed by using a single decision tree-based machine learning model, various ensemble models, and/or a plurality of decision tree-based application models.

Figure 2A:
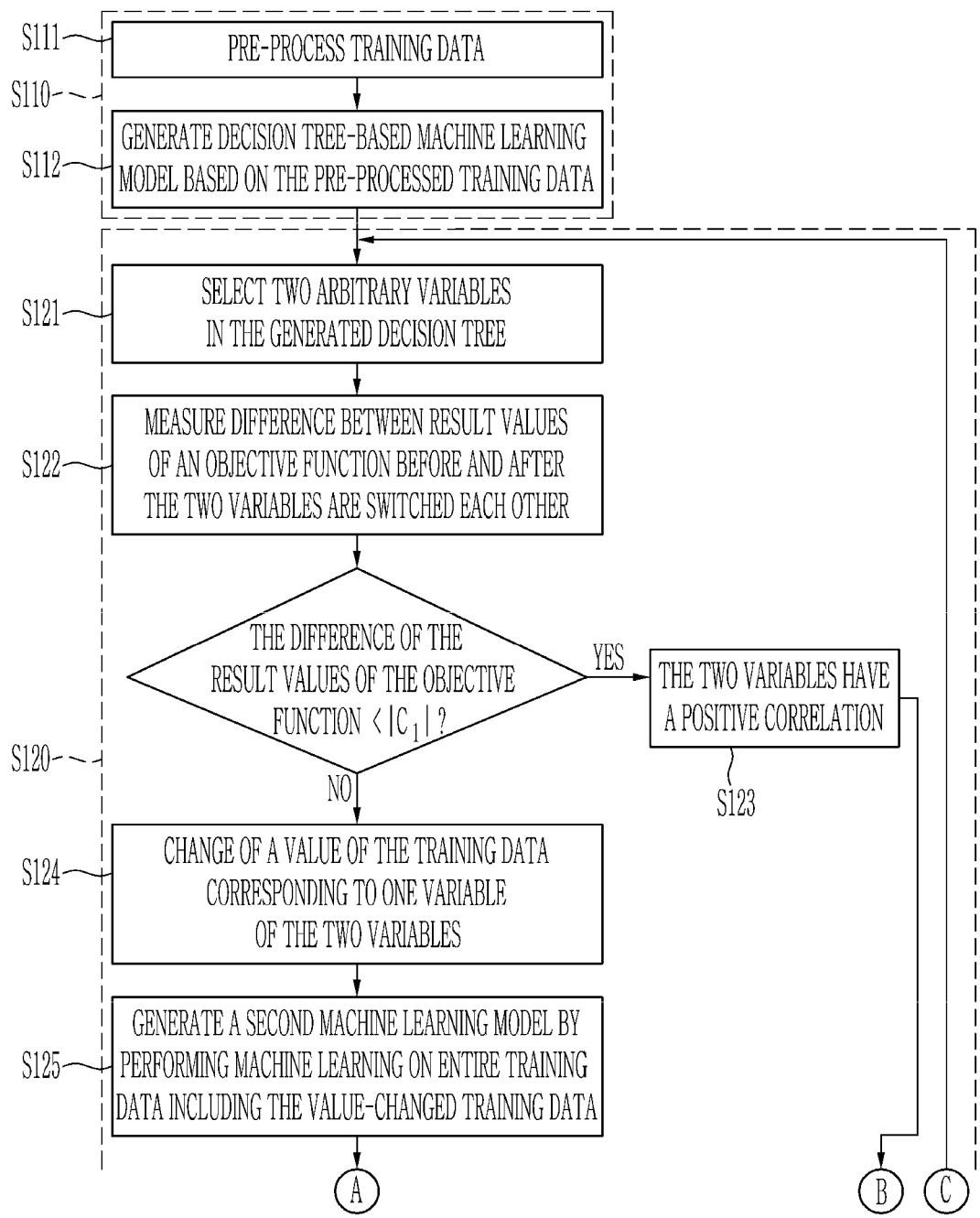
FIGS. 2A and 2B are a flowchart illustrating a method for determining a correlation between variables according to an exemplary embodiment.
Figure 2B:
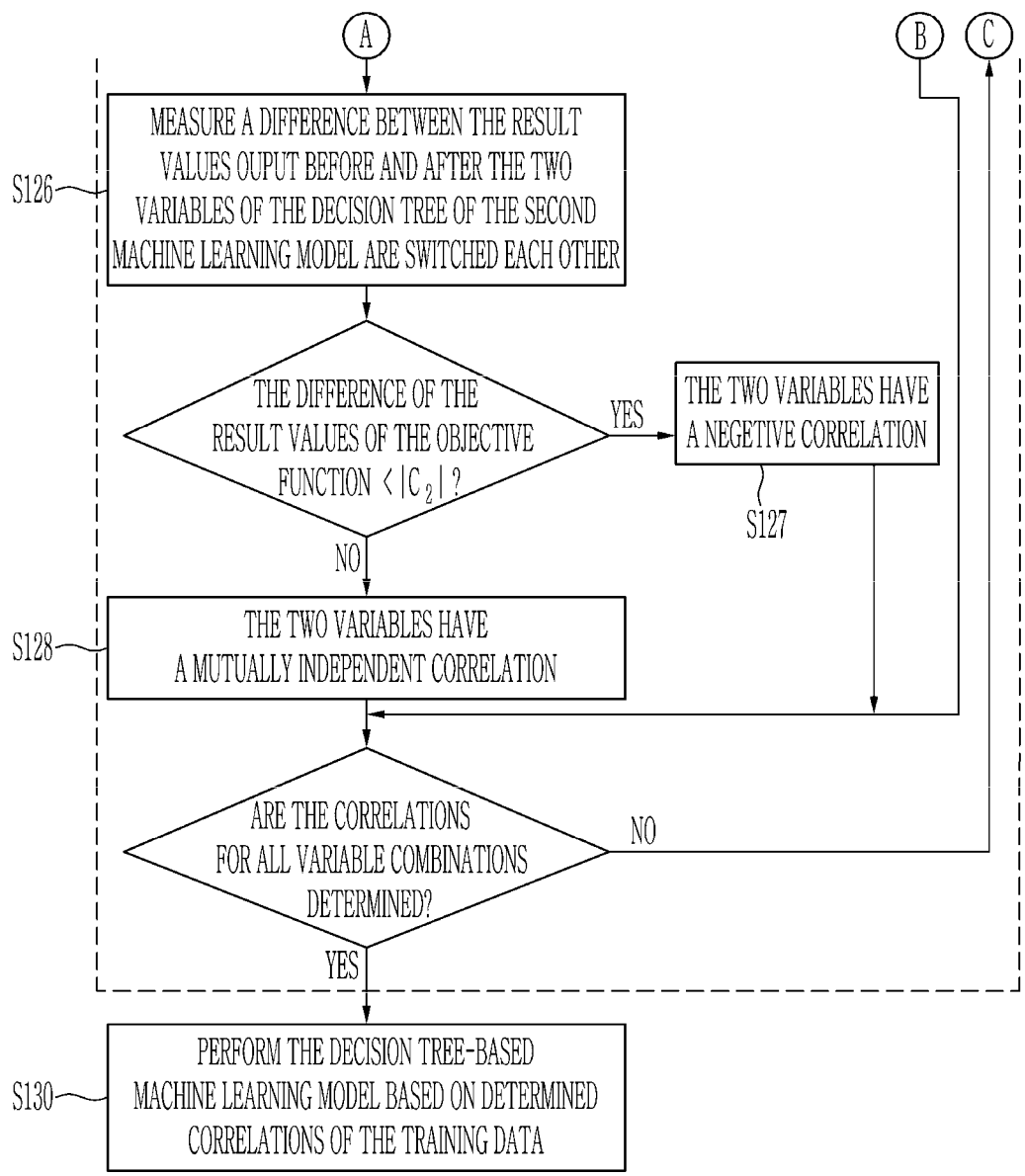

FIGS. 2A and 2B are a flowchart illustrating a method for determining a correlation between variables according to an exemplary embodiment.

Referring to FIGS. 2A and 2B, a method for determining a correlation between the variables of the machine learning according to an exemplary embodiment may include a step of generating a decision tree-based machine learning model based on training data (S110), a step of determining a correlation between two variables selected from a decision tree (S120), and a step of performing (or augmenting) the decision tree-based machine learning based on determined correlations (S130).

First, training data used when generating the decision tree-based machine learning model is pre-processed (S111). For example, the values of the training data for all variables may be normalized to have values from a and to b. Where a and b may be predetermined constants. For example, when the value of the data is X, normalization may be performed so that the value of the training data is included in the range of $0 \leq X \leq 1$. Then, the decision tree-based machine learning model may be generated based on the pre-processed training data (S112).

Arbitrary two variables ($f_A$ and $f_B$) may be selected in the generated decision tree (S121), and a difference between results of an objective function may be measured before and after the orders of the two variables are switched each other (i.e., variable interchanging) (S122). For example, the difference between a first result value output from the objective function to which a variable pair ($f_A$, $f_B$) is input and a second result value output from the objective function to which a variable pair ($f_B$, $f_A$) is input may be calculated. The variable pair ($f_B$, $f_A$) may be referred to as a converted pair of the variable pair ($f_A$, $f_B$).

When the difference between the results of the objective function is smaller than a predetermined threshold $C_1$, it may be determined that the correlation between two variables ($f_A$, $f_B$) is positive correlation (S123). Here, as the difference between the results of the objective function is small, it may be determined that the two variables have a strong positive correlation. The predetermined threshold C1 for determining the difference between the results of the objective function may be a hyper-parameter and may be a constant. The predetermined threshold C1 may mean an allowable range regarding the difference between the results of the objective function, and the type of the correlation may be determined according to the size of the threshold C1.

When the difference between the results of the objective function is greater than the predetermined C1, the correlation between the two variables may be determined as either a negative correlation or a mutually independent correlation. In order to determine the type of the correlation, after the values of one of the two variables are changed, the difference between the results of the objective function may be measured.

For example, an apparatus for determining the correlation between the variables according to the exemplary embodiment may change the values of the training data corresponding to one of the two variables (e.g., $f_B$) (S124) and generate a second machine learning model by performing machine learning on all training data including the value-changed training data (S125). The values of the training data normalized between 0 and 1 may be changed according to Equation 1 below.

$$\underset{BEFORE\ CHANGING}{X} \rightarrow \underset{AFTER\ CHANGING}{1-X} \quad \text{(Equation 1)}$$

For example, for the training data normalized between 0 and 1, the values of variable X may be replaced with their complementary values of 1-X for the purpose of discovering the negative correlation or the mutually independent correlation with the other variable at the next step.

Then, before and after the order of the elements of the variable pair ($f_A$, $f_{Br}$) is switched each other, a difference between the results output from the objective function based on the second machine learning model may be measured (S126). Here, the variable corresponding to the training data of which the values are replaced with their complementary values may be represented by $f_{Br}$. When the difference between the results of the objective function is smaller than a predetermined threshold C2, the two variables in the variable pair ($f_A$, $f_B$) may be determined to have the negative correlation with each other (S127). However, when the difference between the results of the objective function is greater than the predetermined C2, the correlation between the two variables in the variable pair ($f_A$, $f_B$) may be determined as the mutually independent correlation (S128). The predetermined threshold C2 may be a hyper-parameter, may be a constant, and may be equal to or different from the C1.

Then, each step of S120 may be performed for all variable pairs (S129). When M variables is included in the decision tree, the number of trials in step S120 for determining the correlation may be determined based on Equation 2 below.

$$\binom{M}{2} = \frac{M(M-1)}{2} \quad \text{(Equation 2)}$$

That is, if the difference between the results of the objective function before and after switching of the order of the two arbitrary variables (variable interchanging) is relatively small, the two variables may be determined to have the positive correlation. On the other hand, when the values of one of the two variables are replaced with the complementary values, if the difference between the results of the objective function is relatively small, the two variables may be determined to have the negative correlation. Finally, if the two variables are neither the positive correlation nor the negative correlation, the two variables may be classified as the mutually independent correlation which means being low correlated.

Based on the determined correlations of the training data, the learning results of the machine learning model may be correctly explained or interpreted. Further, the variables may be easily clustered using the determined correlation, and the training time of the machine learning model may be shortened by reducing the dimension of the variables based on the determined correlations.

According to the exemplary embodiment, when the correlations of all pairs of variables in the decision tree are determined, the machine learning may be efficiently performed based on the determined correlations. For example, context-based machine learning may be performed based on the correlations between variables included in the decision tree.

Alternatively, by clustering the variables with the positive correlations, finding out opposite relations of the variables with the negative correlations, and simplifying complex relationships between the variables by using the determined mutually independent correlations, an efficiency of the machine learning may be improved, and computing resources used for the machine learning may be saved.

In order to increase predictive power for the target variables by considering complex association of the numerous variables at the same time, correlations between the variables may be determined based on the decision tree algorithm, which is a classification of a supervised machine learning field.

Based on the correlations between the variables, the reliability of the machine learning algorithm may be increased, and an unsupervised learning (e.g., clustering) may be performed. Subsequently, through the clustering of the variables, a systematic understanding of the numerous variables and a simplification to a representative variable may be provided.

Figure 3:
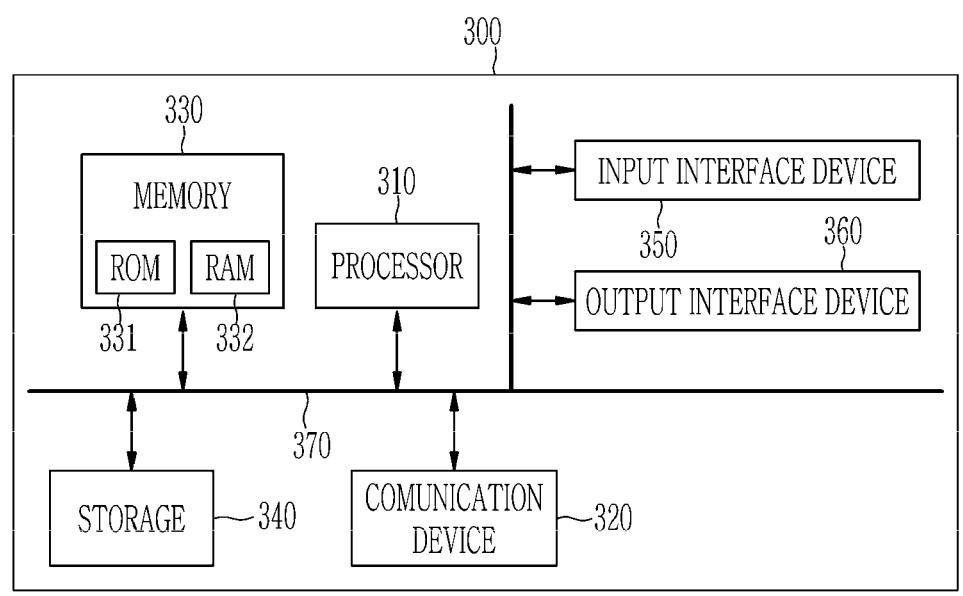
FIG. 3 is a block diagram illustrating an apparatus for determining a correlation between variables according to an exemplary embodiment.

FIG. 3 is a block diagram illustrating an apparatus for determining a correlation between variables according to an exemplary embodiment.

The apparatus for determining a correlation between variables according to an exemplary embodiment may be implemented as a computer system, for example a computer readable medium. Referring to FIG. 3, a computer system 300 may include at least one of processor 310, a memory 330, an input interface unit 350, an output interface unit 360, and storage 340.

The computer system 300 may also include a communication unit 320 coupled to a network. The processor 310 may be a central processing unit (CPU) or a semiconductor device that executes instructions stored in the memory 330 or storage 340.

The memory 330 and the storage 340 may include various forms of volatile or non-volatile storage media. For example, the memory may include read only memory (ROM) 331 or random access memory (RAM) 332.

In the exemplary embodiment of the present disclosure, the memory may be located inside or outside the processor, and the memory may be coupled to the processor through various means already known. Thus, the embodiments may be embodied as a computer-implemented method or as a non-volatile computer-readable medium having computer-executable instructions stored thereon.

In the exemplary embodiment, when executed by a processor, the computer-readable instructions may perform the method according to at least one aspect of the present disclosure. The communication unit 320 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded.

Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium.

The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts.

The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

An apparatus for performing machine learning by determining a correlation between variables according to an exemplary embodiment includes a processor 310 and a memory 330, and the processor 310 executes a program stored in the memory 330 to perform: generating a decision tree-based machine learning model based on training data; selecting two variables from a decision tree of the machine learning model and determining a correlation between two selected variables; and performing the machine learning based on determined correlation.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system (08) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments, but, on the contrary, is intended to cover various modifications and equivalent arrangements included within the spirit and scope of the appended claims.

What is claimed is:

1. An apparatus for performing machine learning by determining a correlation between variables, the apparatus comprising:
   a processor and a memory, wherein the processor executes a program stored in the memory to perform:
   generating a decision tree-based machine learning model based on training data;
   selecting two variables from a decision tree of the machine learning model and determining a correlation between two selected variables; and
   performing the machine learning based on determined correlation,
   wherein when the processor performs the determining of the correlation between the two selected variables, the processor performs:
   measuring a difference between a first result value output from an objective function to which a pair consisting of the two variables is input and a second result value output from the objective function to which a converted pair of the pair is input, wherein an order of the two variables in the pair is switched within the converted pair; and
   determining the correlation between the two selected variables as one of a positive correlation, a negative correlation, and a mutually independent relationship based on the difference between the first result value and the second result value.

2. The apparatus of claim 1,
   wherein when the processor performs the determining of the correlation between the two selected variables, the processor performs:
   determining that the correlation between the two variables is the positive correlation when the difference is smaller than a predetermined first threshold.

3. The apparatus for claim 2,
   wherein when the processor performs the determining of the correlation between the two selected variables, the processor further performs:
   changing values of a first variable of the two variables when the difference is greater than the predetermined first threshold;
   generating a second machine learning model based on training data in which the values of the first variable are changed, and measuring a difference between results of the objective function based on the second machine learning model; and
   determining that the correlation between the two variables is the negative correlation when the difference between the results of the objective function determined based on the second machine learning model is smaller than a predetermined second threshold.

4. The apparatus of claim 3,
   wherein when the processor performs the determining of the correlation between the two selected variables, the processor further performs:
   determining that the correlation between the two variables is the mutually independent relationship when the difference between the results of the objective function based on the second machine learning model is greater than the predetermined second threshold.

5. The apparatus of claim 1,
   wherein when the processor performs the selecting of the two variables from the decision tree of the machine learning model and the determining of the correlation between the two selected variables, the processor performs:
   determining the correlation for all pairs of variables included in the decision tree.

6. A method for performing machine learning by determining a correlation between variables, the method comprising:
   generating a decision tree-based machine learning model based on training data;
   selecting two variables from a decision tree of the machine learning model and determining a correlation between two selected variables; and
   performing the machine learning based on determined correlation,
   wherein the determining a correlation between two selected variables comprises:
   measuring a difference between a first result value output from an objective function to which a pair consisting of the two variables is input and a second result value output from the objective function to which a converted pair for the pair is input, wherein an order of the two variables in the pair is switched within the converted pair; and
   determining the correlation between the two selected variables as one of a positive correlation, a negative correlation, and a mutually independent relationship based on the difference between the first result value and the second result value.

7. The method of claim 6,
wherein the determining a correlation between two selected variables comprises:
determining that the correlation between the two variables is the positive correlation when the difference is smaller than a predetermined first threshold.

8. The method of claim 7,
wherein the determining a correlation between two selected variables comprises:
changing values of a first variable of the two variables when the difference is greater than the predetermined first threshold;
generating a second machine learning model based on training data in which the values of the first variable are changed, and measuring a difference between results of the objective function based on the second machine learning model; and
determining that the correlation between the two variables is the negative correlation when the difference between the results of the objective function based on the second machine learning model is smaller than a predetermined second threshold.

9. The method of claim 8,
wherein the determining a correlation between two selected variables further comprises
determining that the correlation between the two variables is the mutually independent relationship when the difference between the results of the objective function based on the second machine learning model is greater than the predetermined second threshold.

10. The method of claim 6, wherein:
when the method comprises the selecting two variables from a decision tree of the machine learning model and the determining a correlation between two selected variables, the method comprises
determining the correlation for all pairs of variables included in the decision tree.

* * * * *